(12) United States Patent
Abele et al.

(10) Patent No.: US 6,218,560 B1
(45) Date of Patent: Apr. 17, 2001

(54) SURFACE-ACTIVE ORGANOSILICON COMPOUNDS

(75) Inventors: Bors Cajus Abele; Thomas Koini, both of Burghausen (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/448,184

(22) Filed: Nov. 23, 1999

(30) Foreign Application Priority Data

Nov. 24, 1998 (DE) ............................................. 198 54 186

(51) Int. Cl.$^7$ ....................................................... C07F 7/08
(52) U.S. Cl. ........................... 556/413; 556/422; 556/425; 556/427; 556/419; 556/437; 556/439; 556/440; 549/214; 536/123; 536/123.1; 518/198; 518/199; 518/200; 518/201; 518/202; 518/203; 518/204
(58) Field of Search ..................................... 556/413, 422, 556/425, 427, 419, 437, 439, 440; 549/214; 536/123, 123.1; 518/198, 199, 200, 201, 202, 203, 204

(56) References Cited

U.S. PATENT DOCUMENTS

| | | |
|---|---|---|
| 2,846,448 | 8/1958 | Speier . |
| 5,739,192 | 4/1998 | Blizzard et al. . |
| 5,954,869 * | 9/1999 | Elfersy et al. ................. 536/123.1 X |
| 6,066,727 * | 5/2000 | Yamamoto et al. ........... 536/123.1 X |

FOREIGN PATENT DOCUMENTS

| | | |
|---|---|---|
| 43 06 041 A1 | 9/1994 | (DE) . |
| 43 18 536 A1 | 12/1994 | (DE) . |
| 43 18 537 A1 | 12/1994 | (DE) . |
| 43 18 539 A1 | 12/1994 | (DE) . |
| 6-268820 | 9/1994 | (JP) . |

OTHER PUBLICATIONS

Derwent Abstract corresponding to DE—A 4318536 (AN 1995–015012), 1995.
Derwent Abstract corresponding to DE—A 4306041 (AN 1994–265900), 1994.
Derwent Abstract corresponding to JP—A 6268820 (AN 1987–126329), 1987.
Hochmolekularbericht 1974, Degussa, BASF, F. Thurn u.a., represented by DE—A 2262909, 1974.
Derwent Abstract corresponding to DE—A 2262909 (AN 1974–50466), 1974.
Hochmolekularbericht 1959, Dow Corning Corp., represented by US 2,846,448, 1959.
Hochmolekularbericht 1985, Nippon Electric KK, represented by JP—A 58207041, 1985.
Derwent Abstract corresponding to JP—A 58207041 (AN 1984–014382), 1984.
Documentation Abstracts Profile 1991, Toshiba Silicone KK, represented by JP—A 03017086, 1991.
Derwent Abstract corresponding to JP—A 03017086 (AN 1991–069061), 1991.
Hochmolekularbericht 1991, Merck Patent GmbH, represented by DE—A 3930344, 1991.
Derwent Abstract corresponding to DE—A 3930344 (AN 1991–081483), 1991.
Derwent Abstract Corresponding To DE 43 18 537 A (AN 1995–015013), 1995.
Derwent Abstract Corresponding To DE 43 18 539 A (AN 1995–015013), 1995.

* cited by examiner

*Primary Examiner*—Paul F. Shaver
(74) *Attorney, Agent, or Firm*—Brooks & Kushman, P.C.

(57) ABSTRACT

The invention relates to organosilicon compounds modified with mono- or polyhydroxylated hydrocarbon radicals or carbohydrate derivatives and containing units of the general formula (I)

$$A_aR_bSiX_cO_{(4-a-b-c)/2} \quad (I),$$

in which
R is a substituted or unsubstituted hydrocarbon radical,
X is chlorine, or an alkoxy radical,
A is a hydroxylated hydrocarbon, preferably a mono-, oligo-, or polysaccharide, and the sum of a, b, and $c \leq 4$.
The organosilicon compounds are interface-active.

13 Claims, No Drawings

SURFACE-ACTIVE ORGANOSILICON COMPOUNDS

TECHNICAL FIELD

The invention relates to organosilicon compounds modified with mono- or polyhydroxylated hydrocarbon radicals or carbohydrate derivatives, their preparation and use.

BACKGROUND ART

The term organopolysiloxanes in the following text is understood as meaning dimeric, oligomeric and polymeric siloxanes. For example, carbohydrate-modified organopolysiloxanes are described in DE-A-4306041. In that specification, sugar residues are bonded to Si—H-functional organopolysiloxanes via a Pt-catalyzed hydrosilylation reaction of carbohydrate monomers or oligomers containing unsaturated hydrocarbon radicals. A disadvantage of the process of the latter patent is the use of transition metal catalysts to enable bonding of the corresponding carbohydrate compounds to the siloxane derivative. These transition metal catalysts cannot be removed from the product formed.

U.S. Pat. No. 5,739, 192 describes polysiloxane copolymers which are prepared by Michael addition of acrylates onto amino radicals of organopolysiloxanes. The end groups of the polysiloxane copolymers are hydrocarbon or polyether groups. The polysiloxane copolymers can be used as surfactants.

In the case of a hydrocarbon modification with the aid of hydrocarbon-containing (meth)acrylates, hydrophobic compounds are obtained. If polyalkylene oxide-containing acrylates are used, only slightly hydrophilic compounds are obtained.

Polysiloxanes with sugar residues are also described by JP-A-6268820. They are obtained by reaction of polysiloxanes with lactones which are derived from aldonic and uronic acid, and have surface-active properties. A disadvantage is that only oxidized sugars (sugar lactones) can be employed.

Further processes for the preparation of organosilanes, organosiloxanes or organopolysiloxanes containing carbohydrate radicals via nucleophilic addition reactions are described in DE-A-4318536. A disadvantage is that no keto function which can be made available for secondary reactions is present in the precursor.

DISCLOSURE OF INVENTION

The object of the present invention is to provide highly hydrophilic or highly interface- or surface-active organosilicon compounds without the use of transition metal catalysts, and without the disadvantages described above.

BEST MODE FOR CARRYING OUT THE INVENTION

The invention relates to organosilicon compounds containing units of the general formula (I)

in which
R can be identical or different and is a monovalent hydrocarbon radical which has 1 to 22 carbon atoms and is optionally substituted by halogen, amino, mercapto or ammonium groups,
X is identical or different and is a chlorine atom or a radical of the formula —OR$^1$,
$R^1$ is a hydrogen atom or an alkyl radical having 1 to 8 carbon atoms, which can be substituted by ether-oxygen atoms, or a radical of the general formula (II)

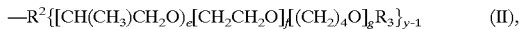

in which
$R^2$ is a divalent, trivalent or tetravalent hydrocarbon radical having 2 to 30 carbon atoms, which may be interrupted by one or more groups of the formulae

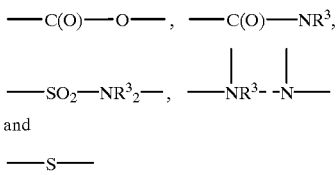

and

—S— and which can be interrupted by oxygen atoms,
y is 2, 3 or 4, according to the valency of the radical $R^2$,
$R^3$ is a hydrogen atom or a hydrocarbon radical which has 1 to 20 carbon atoms and is optionally interrupted by a group —C(O)—,
e, f and g in each case independently of one another are the value 0 or an integer from 1 to 200, with the proviso that the sum of e+f+g≧1,
A is a radical of the general formula (III)

in which
$R^4$ has a meaning given for $R^2$,
y is the value 2, 3 or 4, according to the valency of the radical $R^4$,
n is an integer from 1 to 1,000,000,
a is the value 0, 1 or 2 and
b and c in each case are the value 0, 1, 2 or 3, and in the case of oligo- and polysaccharides, one molecule of $H_2O$ is to be subtracted from the empirical formula per carbohydrate monomer or polymer added to the formula, or A is a partly reduced, oxidized or partly dehydrated or organyl-modified derivative of the formula (III), with the proviso that the sum of a+b+c≦4 and the organosilicon compound contains at least one radical A per molecule.

The organosilicon compounds are organosilicon compounds modified with mono- or polyhydroxylated hydrocarbon radicals or carbohydrate derivatives. These can be both silanes, i.e. compounds of the general formula (I) where a+b+c=4, and siloxanes, i.e. compounds containing units of the general formula (I) where a+b+c≦3. The organosilicon compounds are preferably organopolysiloxanes, in particular those which comprise units of the general formula (I).

The organosilicon compounds preferably have an average molecular weight of 200 to 1,000,000 g/mol, particularly preferably 5000 to 150,000 g/mol, and preferably a viscosity of 10 to 1,000,000 mm$^2$/S, particularly preferably 20 to 100,000 mm$^2$/S, in each case at 25° C.

The organosilicon compounds can be liquid, or else waxy or solid.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl or tert-pentyl radicals; hexyl radicals such as the n-hexyl radical; heptyl radicals such as the n-heptyl radical; octyl radicals such as the n-octyl radical and isooctyl radicals such as the 2,2,4-trimethylphenyl radical; nonyl radicals such as the n-nonyl radical; decyl radicals such as the n-decyl radical;

octadecyl radicals such as the n-octadecyl radical; cycloalkyl radicals such as the cyclopentyl, cyclohexyl or cycloheptyl radicals and methylcyclohexyl radical; alkenyl radicals such as the vinyl, allyl, 3-butenyl, 5-hexenyl, 1-propenyl and 1-pentenyl radicals; alkynyl radicals such as the ethynyl, propargyl and 1-propynyl radicals; aryl radicals such as the phenyl, naphthyl, anthryl and phenanthryl radical; alkaryl radicals, such as o-, m-, and p-tosyl radicals, xylyl radicals and ethylphenyl radicals; and aralkyl radicals such as the benzyl radical, the phenylethyl radical and the phenylnonyl radical.

Examples of substituted hydrocarbon radicals R are haloalkyl radicals, such as the 3,3,3-trifluoro-n-propyl radical, the 2,2,2,2',2',2'-hexafluoroisopropyl radical, the heptafluoroisopropyl radical and haloaryl radicals, such as the o-, m-, and p-chlorophenyl radical.

The radical R is preferably a hydrocarbon radicals which has 1 to 18 carbon atoms, optionally substituted by halogen, amine, mercapto or ammonium groups, the methyl, n-octyl, n-dodecyl and n-octadecyl radicals being particularly preferred.

Examples of alkyl radicals $R^1$ are the examples of alkyl radicals having up to 8 carbon atoms given for the radical R, and the methoxyethyl and ethoxyethyl radicals. The radical $R^1$ is preferably a hydrogen atom or a methyl, ethyl, butyl or propyl group, in particular a methyl or ethyl group.

Examples of radicals $R^2$ are

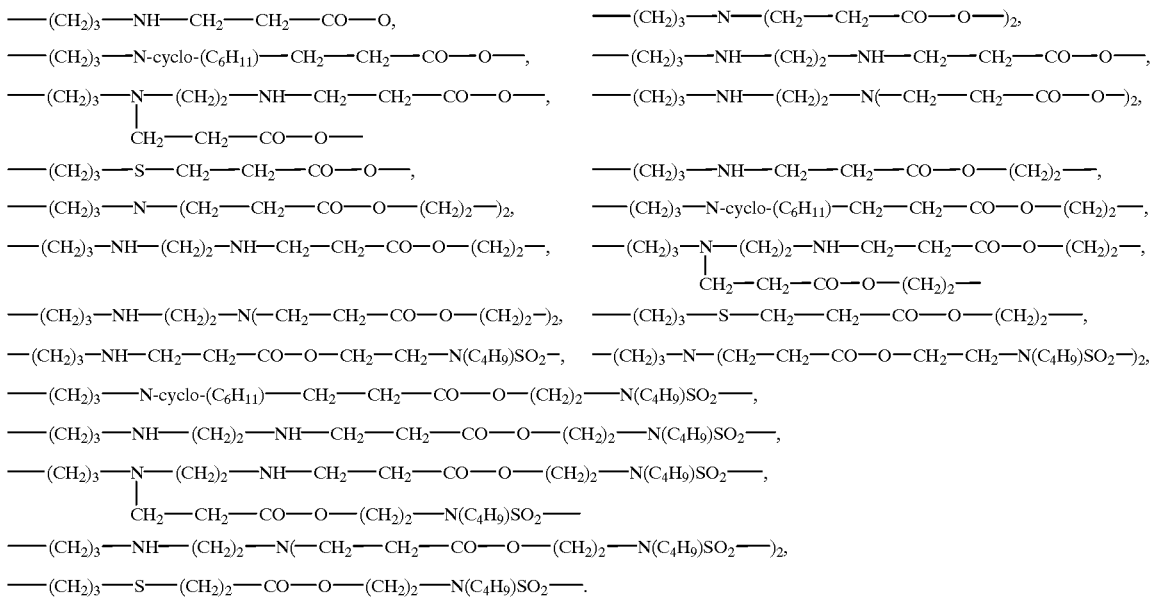

The radical $R^2$ is preferably

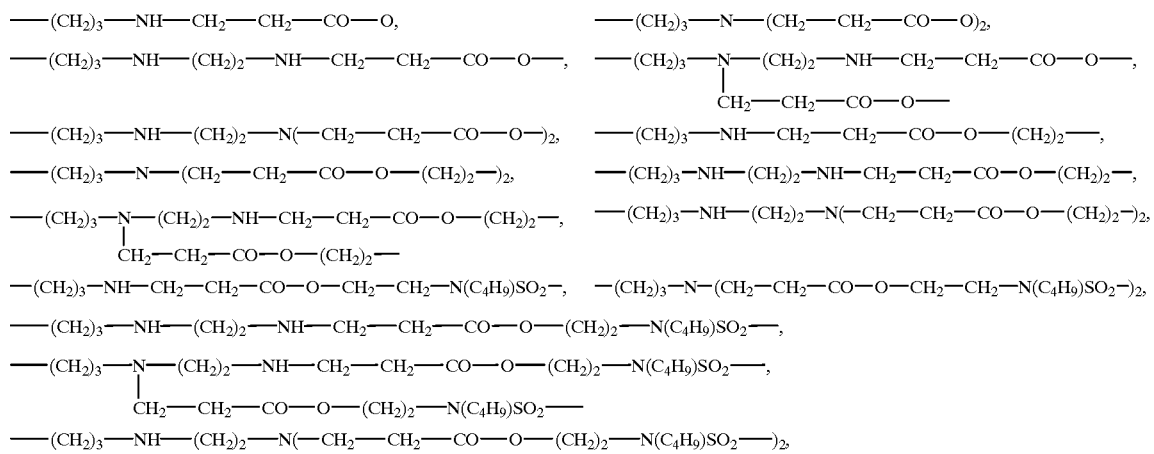

The methacrylates are also preferred.

Examples of radicals $R^3$ are the examples of hydrocarbon radicals having 1–20 carbon atoms given for the radical R, and also —CO—CH$_3$, —CO—CH$_2$—CH$_3$ and —CO—

$CH_2CH_2CH_2CH_3$. The radical $R^3$ is preferably a hydrogen atom or a methyl or butyl group.

Examples of radicals X of the general formula (II) are —$CH_2$—$CH_2$—CO—[$OC_2H_4$]$_9$$OCH_3$, —$CH_2$—$CH_2$—CO—[$OC_2H_4$]$_6$$OC_6H_5$ and —$CH_2$—$CH_2$—CO—[$OC_2H_4$]$_{16}$$OC_6H_4$-p-$C_9H_{19}$. The radicals of the general formula (II) are preferably

—$CH_2$—$CH_2$—CO—[$OC_2H_4$]$_9$$OCH_3$.

The value for the sum of e+f+g is preferably 2 to 30, particularly preferably 4 to 20.

X is preferably the radical —$OR^1$, where $R^1$ has the abovementioned meaning, —$OCH_3$ and —$OC_2H_5$ being particularly preferred.

Preferred examples of the radical $R^4$ are the examples given for the radical $R^2$. The methacrylates are also preferred.

The value of n is preferably 2, 4, 5, 6, 7, 8, 10, 12, 18 or 20, particularly preferably 8, 10 or 12. In oligo- or polysaccharides, however, n can also reach much higher values.

Preferably, the radical A is

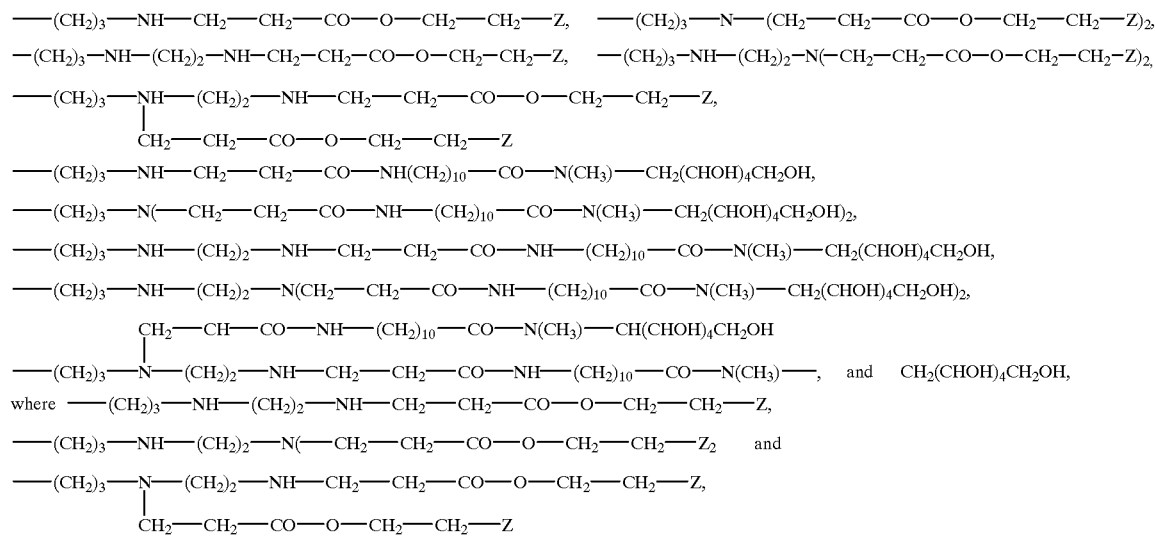

are preferred, and Z is preferably $OC_6H_{11}O_5$,

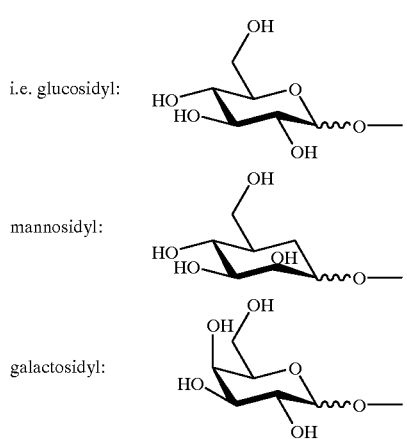

i.e. glucosidyl:

mannosidyl:

galactosidyl:

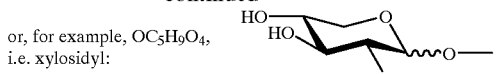

or, for example, $OC_5H_9O_4$, i.e. xylosidyl:

or an oligo- or polysaccharide derivative.

The organosilicon compounds are preferably those of the general formula (IV)

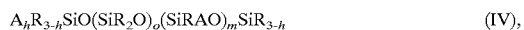
$$A_hR_{3-h}SiO(SiR_2O)_o(SiRAO)_mSiR_{3-h} \quad (IV),$$

in which A and R have the meaning given above for these, h has the value 0, 1 or 2 and m and o are in each case 0 or an integer from 1 to 1000, with the proviso that they contain at least one radical A per molecule and the o units ($SiR_2O$) and the m units (SiRAO) can be distributed as desired in the molecule.

The aminoalkylsilanes, -siloxanes and -polysiloxanes modified with mono- or polyhydroxylated hydrocarbon radicals or by carbohydrate derivatives preferably have a mono- or polyhydroxylated alkyl group content of 0.5 to 99 percent by weight, particularly preferably 1 to 45 percent by weight.

The invention furthermore relates to a process for the preparation of the organosilicon compounds described above, in which organosilicon compounds containing units of the general formula (V)

$$E_aR_bSiX_cO_{(4-a-b-c)/2} \quad (V),$$

in which

R, X, a, b and c have the meanings given above for these symbols and

E is a radical of the general formula (VI) or (VII)

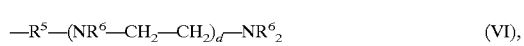
$$-R^5-(NR^6-CH_2-CH_2)_d-NR^6_2 \quad (VI),$$

$$-R^7-SH \quad (VII),$$

in which $R^5$ and R7 in each case independently of one another are divalent, optionally substituted hydrocarbon radicals having 1 to 12 carbon atoms, $R^6$ has a meaning given above for $R^1$, d is the value 0 or an integer from 1 to 8 and in the general formula (VI) at least one radical $R^6$ is a hydrogen atom, with the proviso that they contain at least one unit of the formula E per molecule, are reacted with compounds modified by mono- or polyhydroxylated hydrocarbon radicals or carbohydrate derivatives, of the general formula (VIII)

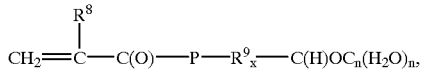
(VIII)

or organyl-substituted derivatives thereof,
in which
$R^8$ is a hydrogen atom or a methyl group,
P is a radical —O— or —$NR^3$—,
k is the value 0 or 1 and
$R^9$ has a meaning given for $R^2$ and
n and $R^3$ have the meanings given above for these symbols.

The reaction can be carried out in bulk, solution or emulsion.

Examples of radicals $R^5$ and $R^7$ are linear or branched alkylene radicals, such as, for example, the 1,2-ethylene, 1,3-propylene, 1,2-propylene, 1,3-(2-methylpropylene) and dimethylmethylene radicals. $R^5$ and $R^7$ are preferably the 1,3-propylene radical.

The radicals E of the general formula (VI) are preferably —$(CH_2)_3NH_2$, —$(CH_2)_3$NH-cyclo-$C_6H_{11}$, —$(CH_2)_3$—NH—$CH_2$—$CH_2$—$NH_2$ and —$(CH_2)_3$—NH—$CH_2$—$CH_2$—$N(C_2H_5)_2$, where —$(CH_2)_3$—$NH_2$ and —$(CH_2)_3$—NH—$CH_2$—$CH_2$—$NH_2$ are particularly preferred. The radicals E of the formula (VII) are preferably —$(CH_2)_3$—SH. The radical E is preferably one of the general formula (VI).

Examples of the radical $R^9$ are linear or branched alkylene radicals, such as, for example, the 1,2-ethylene, 1,3-propylene, 1,2-propylene, 1,3-(2-methylpropylene) and dimethylmethylene radicals, and radicals substituted by —$SO_2NR_3$—, such as the radical —$CH_2$—$CH_2$—$N(C_4H_9)$$SO_2$—. $R^9$ is preferably the 1,2-ethylene radical.

The radical P is preferably the radical —O—.

The organosilicon compounds employed in the process are preferably those of the general formula (IX)

$$E_hR_{3-h}SiO(SiR_2O)_o(SiREO)_mSiR_{3-h}E_h \qquad (IX),$$

in which R, E, h, o and m have the meaning given above for these symbols.

The organosilicon compounds employed in the process are particularly preferably organopolysiloxane oils or waxes with side-chain and/or terminal 3-amino-n-propyl or N-(2-aminoethyl)-3-amino-n-propyl groups and with amine numbers of 0.1 to 5. The amine number designates the number of ml of 1N HCl required to neutralize 1 g of organosilicon compound.

The mono- or polyhydroxylated hydrocarbon radicals or carbohydrate derivatives employed, of the general formula (VIII), are preferably

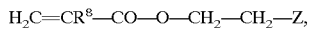

in which Z and $R^8$ have the above meanings.

The organosilicon compounds employed containing units of the general formula (V) and the mono- or polyhydroxylated hydrocarbon radicals or carbohydrate derivatives of the general formula (VIII) are commercially obtainable products or can be prepared by methods known in chemistry.

All known compounds which catalyze reactions similar to the Michael reaction can be employed in the process, such as, for example, glacial acetic acid, tin(IV) chloride, sodium methylate and alkali metal amides, which are not preferred. Free-radical initiators, such as azo compounds and/or peroxo compounds, can furthermore be added as catalysts, which, however, is not preferred. If such catalysts are employed, the amounts are preferably 0.1–5% by weight, based on the total weight of the reactive components.

Preferably, 0.001–10 mol of compound of the general formula (VIII), particularly preferably 0.01–3 mol, in particular 0.1–2 mol, is used in the process per mole of the radical E of the organosilicon compound containing units of the general formula (V) employed.

Organic solvents, water or mixtures thereof can be employed in the process according to the invention, the addition of organic solvents being preferred. Examples of organic solvents which are employed, if appropriate, are toluene, xylene, tetrahydrofuran, n-butyl acetate, isopropanol, methanol, dimethoxyethane, di-n-butyl ether and tert-butyl methyl ketone. If solvents are employed, they are preferably isopropanol, methanol and toluene. If solvents are employed, the amounts are preferably 5–50% by weight, based on the total weight of the reactive components. If solvents are employed, these are preferably removed after the reaction.

The process is preferably carried out under the pressure of the surrounding atmosphere, nominally between 900 and 1100 hPa. However, it can also be carried out under higher or lower pressures.

The process is furthermore preferably carried out at a temperature of 25° C. to 150° C., particularly preferably 25° C. to 120° C., in particular 25° C. to 100° C. However, it can also be carried out at higher or lower temperatures.

In the process, unreacted radicals E of the organosilicon compounds of the general formula (V) can be reacted further with acids to give, for example, ammonium groups, or alkoxylated or (poly- or per)fluoroalkylated (meth)acrylates for further hydrophilicization or oleophobicization of the organosilicon compounds.

It is furthermore also possible to prepare the organosilicon compounds containing units of the general formula (I) by carrying out the polymer-analogous reaction similar to Michael addition with organosilicon compounds functionalized with (meth)acrylate.

The organopolysiloxanes containing mono- or polyhydroxylated hydrocarbon radicals or carbohydrate derivatives and obtained by the process can be equilibrated with organopolysiloxanes (1), preferably chosen from the group consisting of linear organopolysiloxanes containing terminal triorganosiloxy groups, linear organopolysiloxanes containing terminal hydroxyl groups, cyclic organopolysiloxanes and copolymers of diorganosiloxane and monoorganosiloxane units, as a result of which, for example, adjustment of the desired molecular weight and controlled distribution of the mono- or polyhydroxylated hydrocarbon radicals or carbohydrate derivatives in the molecule become possible.

Preferably, linear organopolysiloxanes (1) containing terminal triorganosiloxy groups which are employed are those of the general formula (X)

linear organopolysiloxanes containing terminal hydroxyl groups which are employed are those of the general formula (XI)

cyclic organopolysiloxanes which are employed are those of the general formula (XII)

$$(R^{10}{}_2SiO)_t \tag{XII}$$

and copolymers which are employed are those of units of the general formula (XIII)

$$R^{10}{}_2SiO \text{ and } R^{10}SiO_{3/2} \tag{XIII},$$

in which
$R^{10}$ in each case can be identical or different and has a meaning given for R, r and s in each case are the value 0 or an integer from 1 to 1500 and t is an integer with a value from 3 to 12.

The ratios of amounts of the organopolysiloxanes (1) employed in the optional equilibration and the organosilicon compounds containing units of the general formula (I) are determined only by the desired content of mono- or polyhydroxylated hydrocarbon radicals or carbohydrate derivatives in the organopolysiloxanes produced in the equilibration optionally carried out and by the desired average chain length.

Acid or basic catalysts which promote the equilibration are preferably employed in the optional equilibration, acid catalysts being particularly preferred. Examples of acid catalysts are sulfuric acid, phosphoric acid, trifluoromethanesulfonic acid, phosphonitrile chlorides and solid catalysts which are acidic under the reaction conditions, such as acid-activated bleaching earth, acid zeolites, sulfonated charcoal and sulfonated styrene/divinylbenzene copolymer, phosphonitrile chlorides being preferred as acid catalysts. Acid catalysts are preferably used in amounts of 5 to 1000 ppm (=parts per million) by weight, in particular 50 to 200 ppm by weight, in each case based on the total weight of the organosilicon compounds employed.

Examples of basic catalysts are benzyltrimethylammonium hydroxide, tetramethylanimonium hydroxide, alkali metal hydroxides, alkaline earth metal hydroxides in methanolic solution, phosphonium hydroxides and silanolates, alkali metal hydroxides being preferred as the basic catalysts. Basic catalysts are preferably used in amounts of 50 to 10,000 ppm (=parts per million) by weight, in particular 500 to 2000 ppm by weight, in each case based on the total weight of the organosilicon compounds employed.

The optional equilibration is preferably carried out at 80° C. to 150° C. and under a pressure of the surrounding atmosphere, nominally between 900 and 1100 hPa. If desired, higher or lower pressures can also be applied.

The equilibration is preferably carried out in 5 to 20% by weight, based on the total weight of the particular organosilicon compounds employed, of a water-immiscible solvent, such as toluene. Before the mixture obtained in the equilibration is worked up, the catalyst can be rendered inactive. The processes can be carried out batchwise, semicontinuously or completely continuously. The process has the advantage that it is very easy to carry out and a very high conversion is achieved. The process furthermore has the advantage that on the one hand due to the stoichiometry of the compounds employed and on the other hand due to modification of the polymer structures and chain lengths or the silane structures and due to the chain length of the hydrophilic part of the acrylate derivative, the hydrophilicity of the organosilicon compounds containing units of the general formula (I) can be adjusted in a simple and entirely controlled manner.

The process furthermore has the advantage that no transition metals or heavy metals have to be used and the exposure to heat is low. Advantages of the process also lie in the fact that particular degrees of polymerization of the sugar content in the precursors can be established, with the possibility of the increase in the hydrophilicity being infinitely adjustable.

Without increasing the degree of polymerization of the mono- or polyhydroxylated hydrocarbon radical or carbohydrate derivative in the precursor, there is also the option of adjusting the hydrophilicity by the choice of stoichiometry between, for example, amine functions and precursor to be reacted.

The process is inexpensive because, in the case of the carbohydrate derivatives, it involves simple, naturally occurring sugars such as glucose, which is an aldohexose, which do not have to be pretreated chemically, for example by oxidation or reduction of the sugar structure, or involves carbohydrate glycosides, which are very easy to obtain.

From the toxicological aspect also, the acrylate precursors are acceptable. Up to an oral administration of 16,000 mg/kg of GEMA (glucosyloxyethyl(meth)acrylate)/kg of rat, the survival rate of rats was not influenced. Due to the sugar contents, the compounds prepared by the claimed process are biodegradable and have considerable advantages, for example over silicones derivatized with polyethylene oxide or polypropylene oxide.

The organosilicon compounds containing units of the general formula (I) have the advantage that they combine oleophobic silicon contents and hydrophobic properties and are distinguished by a relatively high resistance to detergents and surface activity. The organosilicon compounds containing units of the general formula (I) furthermore have the advantage that, if necessary, in addition to the oleophobicity of the silicon content, their hydrophilic properties can be adjusted in an entirely controlled manner. The organosilicon compounds containing units of the general formula (I) have a still further advantage that due to the remaining amine groups, they show a good soft handle and a low tendency toward yellowing in textile, carpet and fiber preparation.

The organosilicon compounds containing units of the general formula (I) can be employed for all purposes for which hydrophilicized, surface-active or surface-modifying organosilicon compounds have also hitherto been employed, such as, for example, for the treatment of textile sheet-like structures, such as, for example, woven fabrics, mesh goods or nonwovens, textile fiber preparation and leather treatment, and in cosmetics, for example as an emulsifier or emulsifying auxiliary, and as additives or adjuvants in the care composition, polish, coatings and building materials industry.

The organosilicon compounds containing units of the general formula (I) can be used in plant protection compositions because of their surface activity, surface-modifying and formulation properties.

The organosilicon compounds are of interest above all as surface-active and surface-modifying compounds. These properties, which can also be established by the chosen length of the siloxane moiety, ensure ecocompatibility due to degradation of the substances at the mono- or polyhydroxylated hydrocarbon radical or carbohydrate derivative radical. The organosilicon compounds can furthermore be employed as solvents in solid and liquid formulations and as cationic, anionic or betaine compounds.

The organosilicon compounds can also be employed, inter alia, as nonionic, surface-active compounds, as agents having an antistatic effect, as "releasing" compounds and as modifiers for plastics.

In the examples which follow, all the parts and percentages data relate to the weight, unless stated otherwise. Unless stated otherwise, the examples which follow are carried out under the pressure of the surrounding atmosphere, about 1000 hPa, and at room temperature, about 20° C., or at a temperature which is established when the reactants are brought together at room temperature without additional heating or cooling.

AN denotes amine number.

The compounds employed in the following are

Glucosyloxyethyl acrylate

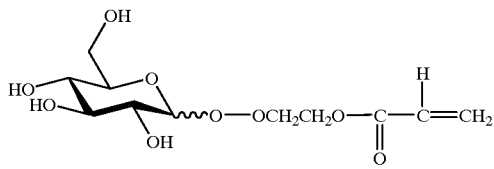

Galactosyloxyethyl acrylate

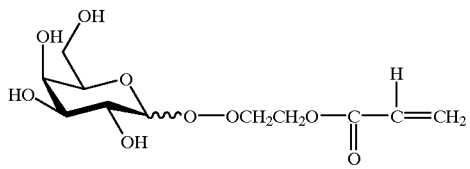

Mannosyloxyethyl acrylate

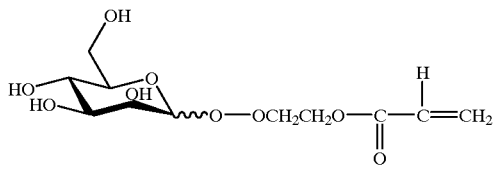

Xylosyloxyethyl acrylate

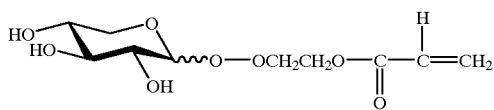

or in each case the corresponding methacrylates, for example glucosyloxyethyl methacrylate (GEMA).

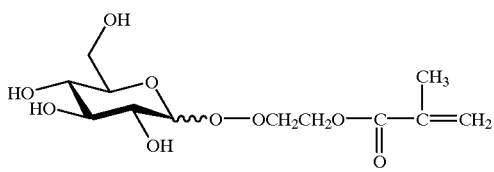

EXAMPLE 1

7.30 g (26.25 mmol) of glucosyloxyethyl acrylate are added to a solution of 70.0 g of α,ω-functionalized amino-silicone oil (amine number, "AN"=0.75; 26.25 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 2

7.30 g (26.25 mmol) of glucosyloxyethyl acrylate are added to a solution of 70.0 g of α,ω-functionalized amino-silicone oil (AN=0.75; 26.25 mmol of primary amine) and 100 ml of 1,4-dioxane and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 3

7.30 g (26.25 mmol) of glucosyloxyethyl acrylate are added to a solution of 70.0 g of α,ω-functionalized amino-silicone oil (AN=0.75; 26.25 mmol of primary amine) and 100 ml of n-dibutyl ether and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 4

7.30 g (26.25 mmol) of glucosyloxyethyl acrylate are added to a solution of 70.0 g of α,ω-functionalized amino-silicone oil (AN=0.75; 26.25 mmol of primary amine) and 100 ml of tert-butyl methyl ketone and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 5

2.09 g (7.5 mmol) of glucosyloxyethyl acrylate are added to a solution of 60.0 g of "lateral" amino-silicone oil having pendant aminoalkyl functionality (AN=0.25; 7.5 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 6

5.01 g (18.0 mmol) of glucosyloxyethyl acrylate are added to a solution of 60.0 g of aminosilicone wax (AN=0.6; 18.0 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 7

14.61 g (52.5 mmol) of glucosyloxyethyl acrylate are added to a solution of 70.0 g of α,ω-functionalized amino-silicone oil (AN=0.75; 26.25 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 8

4.17 g (15.0 mmol) of glucosyloxyethyl acrylate are added to a solution of 60.0 g of lateral amino-silicone oil (AN=0.25; 7.5 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 9

10.02 g (36.0 mmol) of glucosyloxyethyl acrylate are added to a solution of 60.0 g of aminosilicone wax (AN=0.6; 18.0 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 10

11.69 g (42.0 mmol) of glucosyloxyethyl acrylate are added to a solution of 30.0 g of mercapto-functional silicone oil (SH number=1.4; 42.0 mmol of SH) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 11

2.38 g (8.55 mmol) of glucosyloxyethyl acrylate and 4.13 g of polyoxyalkylene-functionalized acrylate (8.55 mmol) are added to a solution of 60.0 g of lateral aminosilicone oil (AN=0.57; 17.1 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 12

2.50 g (9.0 mmol) of glucosyloxyethyl acrylate and 5.49 g of polyfluoroalkyl-functionalized acrylate (9.0 mmol) are added to a solution of 60.0 g of aminosilicone wax (AN=0.6; 18.0 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 13

9.52 g (34.2 mmol) of glucosyloxyethyl acrylate are added to a solution of 60.0 g of lateral aminosilicone oil (AN=0.57; 17.1 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 14

16.70 g (60.0 mmol) of glucosyloxyethyl acrylate are added to a solution of 60.0 g of aminosilicone wax (AN=1.0; 30.0 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 15

4.17 g (15.0 mmol) of galactosyloxyethyl acrylate are added to a solution of 60.0 g of lateral aminosilicone oil (AN=0.25; 7.5 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 16

4.17 g (15.0 mmol) of mannosyloxyethyl acrylate are added to a solution of 60.0 g of lateral aminosilicone oil (AN=0.25; 7.5 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 17

3.96 g (15.0 mmol) of xylosyloxyethyl acrylate are added to a solution of 60.0 g of lateral aminosilicone oil (AN=0.25; 7.5 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

EXAMPLE 18

17.54 g (60.0 mmol) of glucosyloxyethyl methacrylate are added to a solution of 60.0 g of aminosilicone wax (AN=0.1; 30.0 mmol of primary amine) and 100 ml of isopropanol and the reaction mixture is heated at a temperature of 70° C. for 4 hours. The solvent is then distilled off at a flask internal temperature of 40–50° C. and a pressure of 20 mbar. Thereafter, the reaction mixture is heated thoroughly for 0.5 hours at a temperature of 40–50° C. and a pressure of 20 mbar to remove the volatile constituents.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An organosilicon compound comprising units of the general formula (I)

$$A_aR_bSiX_cO_{(4-a-b-c)/2} \quad (I)$$

in which
R is identical or different and is a monovalent hydrocarbon radical which has 1 to 22 carbon atoms optionally substituted by halogen, amino, mercapto or ammonium groups,
X is identical or different and is a chlorine atom or a radical of the formula $-OR^1$,
$R^1$ is a hydrogen atom or an alkyl radical having 1 to 8 carbon atoms optionally substituted by ether-oxygen atoms, or is a radical of the general formula (II)

$$-R^2\{[CH(CH_3)CH_2O]_e[CH_2CH_2O]_f[(CH_2)_4O]_gR_3\}_{y-1} \quad (II),$$

in which
$R^2$ is a divalent, trivalent or tetravalent hydrocarbon radical having 2 to 30 carbon atoms, interrupted by one or more groups of the formulae

—C(O)—O—, —C(O)—NR³,
—SO₂—NR³₂—, —NR³—N— and

—S— and which can further be interrupted by oxygen atoms,
y is 2, 3 or 4, according to the valency of the radical $R^2$,
$R^3$ is a hydrogen atom or a hydrocarbon radical which has 1 to 20 carbon atoms and is optionally interrupted by a group —C(O)—,
e, f and g independently are 0 or an integer from 1 to 200, with the proviso that the sum of $e+f+g \geq 1$,
A is a radical of the general formula (III)

$$-R^4\{-C(H)C_n(H_2O)_n\}_{y-1} \quad (III),$$

in which
$R^4$ has a meaning given for $R^2$,
y is 2, 3 or 4, according to the valency of the radical $R^4$,
n is an integer from 1 to 1,000,000,
a is 0, 1 or 2 and
b and c in each case are 0, 1, 2 or 3, and when (III) is an oligo- or polysaccharide, one molecule of H₂O is subtracted from the empirical formula per carbohydrate monomer or polymer added to the formula, or A is a partly reduced, oxidized, or partly dehydrated or organyl-modified derivative of the formula (III), with the proviso that the sum of $a+b+c \leq 4$ and the organosilicon compound contains at least one radical A per molecule.

2. An organosilicon compound as claimed in claim 1, which has an average molecular weight of 200 to 1,000,000 g/mol.

3. An organosilicon compound as claimed in claim 1, in which n is 2, 4, 6, 8, 10, 12, 18 or 20.

4. An organosilicon compound as claimed in claim 1, which corresponds to the general formula (IV)

$$A_hR_{3-h}SiO(SiR_2O)_o(SiRAO)_mSiR_{3-h}A_h \quad (IV),$$

in which
h is 0, 1 or 2 and
m and o are independently 0 or an integer from 1 to 1000, with the proviso that said compound contains at least one radical A per molecule and the o units (SiR₂O) and the m units (SiRAO) can be distributed in any manner in the molecule.

5. A process for the preparation of an organosilicon compound as claimed in claim 1, in which an organosilicon compound containing units of the general formula (V)

$$E_aR_bSiX_cO_{(4-a-b-c)/2} \quad (V),$$

in which
E is a radical of the general formula (VI) or (VII)

$$-R^5-(NR^6-CH_2-CH_2)_d-NR^6_2 \quad (VI),$$

$$-R^7-SH \quad (VII),$$

in which
$R^5$ and $R^7$ independently are divalent, optionally substituted hydrocarbon radicals having 1 to 12 carbon atoms, $R^6$ has the meaning of $R^1$,
d is 0 or an integer from 1 to 8 and
in the general formula (VI) at least one radical $R^6$ is a hydrogen atom, with the proviso that it contains at least one unit of the formula E per molecule;
is reacted with a compound modified by mono- or polyhydroxylated hydrocarbon radicals or carbohydrate derivatives, of the general formula (VIII)

$$CH_2=\overset{R^8}{\underset{|}{C}}-C(O)-P-R^9_k-C(H)OC_n(H_2O)_n, \quad (VIII)$$

or an organyl-substituted derivative thereof,
in which
$R^8$ is a hydrogen atom or a methyl group,
P is a radical —O— or $-NR^3-$,
k is 0 or 1, and
$R^9$ has a meaning of $R^2$.

6. The process as claimed in claim 5, in which the organosilicon compound employed is one of the general formula (IX)

$$E_hR_{3-h}SiO(SiR_2O)_o(SiREO)_mSiR_{3-h}E_h \quad (IX),$$

in which E is a radical of the general formula (VI) or (VII)

$$-R^5-(NR^6-CH_2-CH_2)_d-NR^6_2 \quad (VI),$$

$$-R^7-SH \quad (VII),$$

h is 0, 1, or 2 and
o and m are independently 0 or an integer from 1 to 1000, with the proviso that said compound contains at least one radical E per molecule and the o units (SiR₂O) and the m units (SiREO) can be distributed in any manner in the molecule.

7. The process as claimed in claim 5, in which the mono- or polyhydroxylated hydrocarbon radicals or carbohydrate derivatives employed, of the general formula (VIII), are compounds $$H_2C=CH-CO-O-CH_2-CH_2-Z,$$

in which Z is $OC_6H_{11}O_5$, or an oligo- or polysaccharide derivative thereof.

8. The process as claimed in claim 5, in which the mono- or polyhydroxylated hydrocarbon radicals or carbohydrate derivatives employed, of the general formula (VIII), are compounds

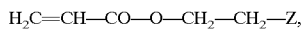

$$H_2C=CH-CO-O-CH_2-CH_2-Z,$$

in which Z is $OC_6H_{11}O_5$, or an oligo- or polysaccharide derivative thereof.

9. The process as claimed in claim 5, in which 0.001–10 mol of compound of the general formula (VIII) is employed per mole of the radical E of the organosilicon compound containing units of the general formula (V).

10. The process as claimed in claim 6, in which 0.001–10 mol of compound of the general formula (VIII) is employed per mole of the radical E of the organosilicon compound containing units of the general formula (V).

11. The process as claimed in claim 7, in which 0.001–10 mol of compound of the general formula (VIII) is employed per mole of the radical E of the organosilicon compound containing units of the general formula (V).

12. A process for modifying interface properties of a composition in need thereof by use of a surface-active compound, said process comprising adding an effective interface-modifying amount of the organosilicon compound of claim 1 to said composition.

13. A process for modifying interface properties of a composition in need thereof by use of a surface-active compound, said process comprising adding an effective interface-modifying amount of the organosilicon compound of claim 4 to said composition.

* * * * *

UNITED STATES PATENT AND TRADEMARK OFFICE
CERTIFICATE OF CORRECTION

PATENT NO. : 6,218,560 B1
DATED : April 17, 2001
INVENTOR(S) : Bors Cajus Abele, et al.

It is certified that error appears in the above-identified patent and that said Letters Patent is hereby corrected as shown below:

<u>Column 15,</u>
Line 29, claim 1, delete "and" and insert -- or --.

Signed and Sealed this

Twenty-eighth Day of August, 2001

Attest:

*Nicholas P. Godici*

NICHOLAS P. GODICI
*Attesting Officer*     *Acting Director of the United States Patent and Trademark Office*